United States Patent
Yang et al.

(10) Patent No.: US 12,009,603 B2
(45) Date of Patent: Jun. 11, 2024

(54) BIAS TEE CIRCUIT AND CALIBRATION BOARD FOR BASE STATION ANTENNA

(71) Applicant: CommScope Technologies LLC, Hickory, NC (US)

(72) Inventors: Lei Yang, Suzhou (CN); Hangsheng Wen, Suzhou (CN)

(73) Assignee: CommScope Technologies LLC, Claremont, NC (US)

( * ) Notice: Subject to any disclaimer, the term of this patent is extended or adjusted under 35 U.S.C. 154(b) by 337 days.

(21) Appl. No.: 17/605,673

(22) PCT Filed: Mar. 26, 2020

(86) PCT No.: PCT/US2020/024824
§ 371 (c)(1),
(2) Date: Oct. 22, 2021

(87) PCT Pub. No.: WO2020/219204
PCT Pub. Date: Oct. 29, 2020

(65) Prior Publication Data
US 2022/0209406 A1    Jun. 30, 2022

(30) Foreign Application Priority Data
Apr. 25, 2019 (CN) .......................... 201910336401.7

(51) Int. Cl.
*H01Q 3/26* (2006.01)
*H01P 1/20* (2006.01)
(Continued)

(52) U.S. Cl.
CPC ........... *H01Q 3/267* (2013.01); *H01P 1/2007* (2013.01); *H01P 5/19* (2013.01); *H04B 7/0617* (2013.01); *H04B 7/086* (2013.01)

(58) Field of Classification Search
None
See application file for complete search history.

(56) References Cited

U.S. PATENT DOCUMENTS

| | | | |
|---|---|---|---|
| 5,105,172 A | * | 4/1992 | Khatibzadeh .......... H04B 15/02 333/175 |
| 6,229,408 B1 | | 5/2001 | Jovanovich et al. |

(Continued)

FOREIGN PATENT DOCUMENTS

| | | |
|---|---|---|
| CN | 209767534 U | 12/2019 |
| WO | 2017117129 A1 | 7/2017 |

OTHER PUBLICATIONS

"Indian Examination Report in Corresponding Application No. 202127044630, dated Aug. 3, 2023, 6 pages".
(Continued)

*Primary Examiner* — Kenneth B Wells
(74) *Attorney, Agent, or Firm* — Myers Bigel, P.A.

(57) ABSTRACT

A bias tee circuit comprises: a combining path having first and second ends and configured to transmit a combined signal which comprises a combination of an RF signal and a DC signal; an RF path having first and second ends and configured to transmit the RF signal included in the combined signal; a DC path having first and second ends and configured to transmit the DC signal included in the combined signal; and an impedance transformer connected between the first end of the combining path, the first end of the RF path and the first end of the DC path, and configured to make the reflection coefficient of the transmitted RF signal have at least two resonant modes within an operating RF band.

14 Claims, 5 Drawing Sheets

(51) Int. Cl.
  *H01P 5/19* (2006.01)
  *H04B 7/06* (2006.01)
  *H04B 7/08* (2006.01)

(56) References Cited

U.S. PATENT DOCUMENTS

| | | | | |
|---|---|---|---|---|
| 6,639,461 | B1* | 10/2003 | Tam | H03F 3/602 |
| | | | | 330/133 |
| 6,731,172 | B2 | 5/2004 | Thompson | |
| 7,012,486 | B2* | 3/2006 | Ji | H01F 27/027 |
| | | | | 333/185 |
| 10,122,336 | B1 | 11/2018 | Jang et al. | |
| 2006/0022771 | A1 | 2/2006 | Ji | |
| 2007/0063771 | A1* | 3/2007 | Pan | H01P 1/2007 |
| | | | | 330/149 |
| 2009/0237167 | A1 | 9/2009 | Lin | |
| 2015/0111504 | A1 | 4/2015 | Zhang et al. | |

OTHER PUBLICATIONS

"European Search Report in Corresponding Patent Application No. 20795743.2 dated Nov. 25, 2022, 12 pages".
"Notification of Transmittal of the International Search Report and the Written Opinion of the International Searching Authority, or the Declaration for corresponding International Application No. PCT/US2020/024824, dated Sep. 21, 2020, (13 pages)".
Reeve, Whitham D., "Packaging a Bias-Tee Module", Article [online]. Jun. 1999 [retrieved May 26, 2020]. Retrieved from the Internet: <URL:http://www.reeve.com/Documents/Articles%20Papers/Reeve_BiasTeePkg.pdf>.

* cited by examiner

BIAS TEE CIRCUIT AND CALIBRATION BOARD FOR BASE STATION ANTENNA

CROSS-REFERENCE TO RELATED APPLICATION

The present application is a 35 U.S.C. § 371 national stage application of PCT Application No. PCT/US2020/024824, filed on Mar. 26, 2020, which claims priority to Chinese Patent Application No. 201910336401.7, filed Apr. 25, 2019, and the entire content of each above-identified application is incorporated herein by reference as if set forth fully herein.

FIELD

The present disclosure relates to the field of radio frequency (RF) communications, and in particular to bias tee circuits for use in this field.

BACKGROUND

The use of beamforming base station antennas can improve the channel multiplexing rate and the coverage area of a base station of a mobile communication system, and overcome the increasingly serious interference problems such as co-channel interference, multipath fading and the like. When using a beamforming antenna, it is necessary to calibrate the antenna array to ensure that the phase relationships between the different RF paths are known and can be accounted for in the beamforming operations. The operating frequency band for beamforming antennas is also increasing, and thus suitable techniques for calibrating wideband beamforming antennas are needed.

Bias tee circuits are often used in base station antennas to allow low frequency Antenna Interface Signaling Group (AISG) signals and/or direct current (DC) power signals to be transmitted to the antenna via the same coaxial cable that is used to transmit RF signals to the antenna, thereby reducing both the cable count and the loading of the antenna tower.

SUMMARY

One of the objects of the present disclosure is to provide a new bias tee circuit and a calibration board for a base station antenna including the bias tee circuit.

According to a first aspect of the present invention, a bias tee circuit is provided, which comprises: a combining path having a first end and a second end, and configured to transmit a combined signal which comprises a combination of an RF signal and a DC signal; an RF path having a first end and a second end and configured to transmit the RF signal included in the combined signal; a DC path having a first end and a second end and configured to transmit the DC signal included in the combined signal; and an impedance transformer connected between the first end of the combining path, the first end of the RF path, and the first end of the DC path, and configured to make the reflection coefficient of the RF signal transmitted between the second end of the combining path and the second end of the RF path have at least two resonant modes within an operating RF band.

According to a second aspect of the present invention, a calibration board for a base station antenna is provided, which comprises: the above-mentioned bias tee circuit; a calibration port; a DC bias port; and a power divider. The second end of the combining path in the bias tee circuit is connected to the calibration port and configured to input a calibration signal as the combined signal, the second end of the RF path is connected to an input of the power divider and configured to output the RF signal to the power divider, and the second end of the DC path is connected to the DC bias port and configured to output the DC signal for driving a RET.

According to a third aspect of the present invention, a bias tee circuit is provided, which comprises: a DC port; a RF port; a combined port; and an impedance transformer that is configured to pass DC signals received at the combined port to the DC port while substantially blocking RF signals received at the combined port from passing to the DC port and that is configured to pass RF signals received at the combined port to the RF port while substantially blocking DC signals received at the combined port from passing to the RF port; wherein the impedance transformer includes a closed loop that connects the combined port to both the DC port and to the RF port.

Other features of the present invention and the advantages thereof will become apparent through the following detailed descriptions of exemplary embodiments of the present invention with reference to the accompanying drawings.

Figure 1:
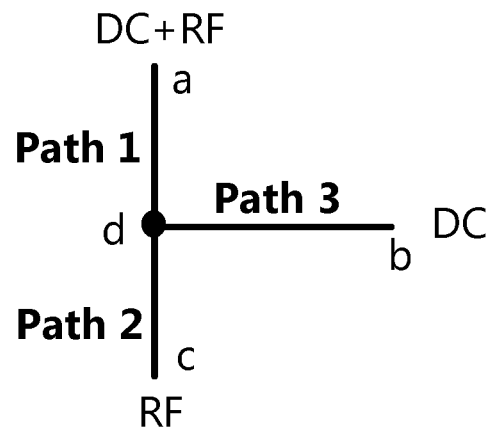
FIG. 1 is a simplified schematic diagram of a conventional bias tee circuit.

Note that, in the embodiments described below, in some cases the same portions or portions having similar functions are denoted by the same reference numerals in different drawings, and description of such portions is not repeated. In some cases, similar reference numerals and letters are used to refer to similar items, and thus once an item is defined in one figure, it need not be further discussed for following figures.

In order to facilitate understanding, the position, the size, the range, or the like of each structure illustrated in the drawings and the like are not accurately represented in some cases. Thus, the disclosure is not necessarily limited to the position, size, range, or the like as disclosed in the drawings and the like.

DETAILED DESCRIPTION

The present invention will be described with reference to the accompanying drawings, which show a number of example embodiments thereof. It should be understood, however, that the present invention can be embodied in many different ways, and is not limited to the embodiments described below. Rather, the embodiments described below are intended to make the disclosure of the present invention more complete and fully convey the scope of the present invention to those skilled in the art. It should also be understood that the embodiments disclosed herein can be combined in any way to provide many additional embodiments.

Please note that the terminology used herein is for the purpose of describing particular embodiments, but is not intended to limit the scope of the present invention. All terms (including technical terms and scientific terms) used herein have meanings commonly understood by those skilled in the art unless otherwise defined. For the sake of brevity and/or clarity, well-known functions or structures may be not described in detail.

FIG. 1 is a simplified schematic diagram of a conventional bias tee circuit. As shown in FIG. 1, the conventional bias tee circuit includes three conductive paths that are commonly connected at point d, that is, Paths 1-3, which respectively transmit three kinds of signals, i.e., a combined signal (a DC signal+an RF signal) on Path 1, an RF signal on Path 2, and a DC signal on Path 3. In some cases, a DC+RF signal is input at one end (i.e., Point a in FIG. 1) of Path 1, and ideally, the RF signal in the combined signal is transmitted to Point c without loss, and the DC signal is transmitted to Point b without loss. However, the connection of path 3 has an effect on the transmission of the RF signal between Point a and Point b and hence some of the RF energy input at Point a may be reflected backwards instead of passing to Point c. The return loss between Point a and Point b may be reduced or minimized by making the connection at between Point d and Point b appear as an open-circuit for the transmitted RF signal. In the case where the bias tee circuit is implemented using microstrip transmission lines on a printed circuit board (PCB), this may be accomplished by setting the length of Path 3 to be $\lambda/4$, where $\lambda$ corresponds to the center frequency of the operating frequency band of the RF signal. This is because according to the calculation formula of the reflection coefficient from Point a to Point b, the reflection coefficient exhibits a resonant mode when Path 3 has a length of $\lambda/4$, that is, has a minimum value. However, the magnitude of the reflection coefficient remains small only within a very narrow range around the center frequency of the operating frequency band. Consequently, the bias tee circuit may only exhibit good return loss performance over a relatively narrow frequency range.

As discussed above, in the conventional bias tee circuit shown in FIG. 1, in order to transmit an RF signal between Point a and Point c without loss, Path 3 should be equivalent to an open-circuit at the connection Point b. By designing the length or impedance of Path 3, the impedance transformation can be performed so that Path 3 appears as an open-circuit at connection Point b, but this can only be achieved at a single frequency. The conventional bias tee circuit can also have a good return loss characteristic over a frequency range around this frequency point, but the frequency range over which the return loss remains small is narrow since the reflection coefficient of the RF signal between Point a and Point c has only one resonant mode. As a result, the conventional bias tee circuit can only transmit RF signals from Point a to point c with a low return loss within a very narrow frequency band. However, in practice, a bias tee circuit having a wide operating frequency band may be desired.

Pursuant to embodiments of the present invention, the frequency range over which a bias tee circuit will exhibit low return loss can be widened by adding an impedance transformer between the three paths included in the conventional bias tee circuit of FIG. 1. The impedance transformer can be designed to match the impedances of the three paths, so as to introduce one or more additional resonant modes that widen the operating frequency bandwidth of the bias tee circuit (i.e., the bandwidth over which the bias tee circuit provides acceptable return loss performance). The impedance transformer may be designed so that at and near two frequencies corresponding to the resonant modes, the DC path appears as an open-circuit (or approximately as an open-circuit) along two (or more) paths through which the RF signal passes, and due to the interaction of the two relatively adjacent resonant modes, the reflection coefficient for the RF signal within the frequency band between the two resonant frequencies also decreases. Therefore, the reflection coefficient for the RF signal has lower values at the two resonance frequencies in the operating frequency band, and also within the frequency band between the two resonance frequencies. That is to say, the impedance transformer can make the reflection coefficient for the RF signal lower in a frequency band, thereby expanding the operating band of the bias tee circuit. Of course, those skilled in the art would understand that the newly-added impedance transformer need not only cause two resonant modes, but may also introduce more resonant modes as needed, thereby further expanding the operating frequency band and/or reducing the reflection coefficient in the frequency band.

Figure 2:
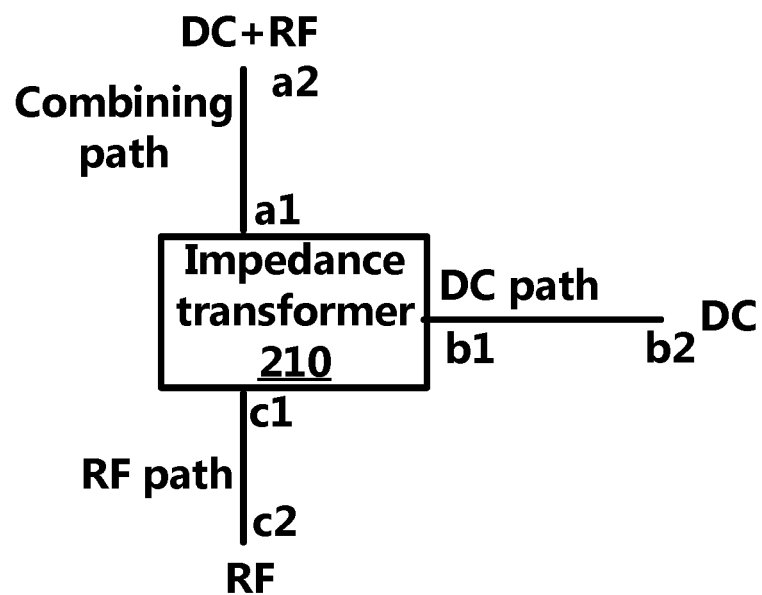
FIG. 2 is a schematic diagram of a bias tee circuit in accordance with some exemplary embodiments of the present invention.

FIG. 2 is a schematic diagram of a bias tee circuit in accordance with some example embodiments of the present disclosure.

As shown in FIG. 2, the bias tee circuit includes a combining path, an RF path, a DC path, and an impedance transformer 210 that is connected between the three paths. The combining path has a first end a1 and a second end a2, and is configured to pass a combined signal (DC+RF) which is the combination of an RF signal and a DC signal. The DC path has a first end b1 and a second end b2, and is configured to pass the DC signal that is included in the combined signal. The RF path has a first end c1 and a second end c2, and is configured to pass the RF signal that is included in the combined signal.

The impedance transformer 210 is connected between the first end a1 of the combining path, the first end b1 of the DC path, and the first end c1 of the RF path, and is configured to make the reflection coefficient of the RF signal transmitted between the second end a2 of the combining path and the second end c2 of the RF path have at least two resonant modes within an operating frequency band of the RF signal.

It should be noted that the present invention does not limit the flow directions of the signals in the bias tee circuit. The bias tee circuit according to the present invention can receive a combined signal at the port a2 of the combining path and output DC and RF signals from the other two ports b2 and c2, respectively, or can receive DC and RF signals at ports b2 and c2 respectively and output a combined signal DC+RF at port a2, or can also be designed so as to be suitable for bidirectional flow of the signals. Therefore, the above-mentioned reflection coefficient of the RF signal transmitted between the second end a2 of the combining path and the second end c2 of the RF path may be determined by the flow direction of the RF signal. For example, when the RF signal flows from the combining path to the RF path, the reflection coefficient is that for the RF signal from the input end a2 of the combining path to the output end c2 of the RF path, which has at least two resonant modes, that is, local minimum values, within the operating frequency band. In other embodiments, when the RF signal flows from the RF path to the combining path, the reflection coefficient is that for the RF signal from the input end c2 of the RF path to the output end a2 of the combining path, which has at least two resonant modes, that is, local minimum values, within the operating frequency band.

In some embodiments, the above-mentioned operating frequency band may be the 2.3-2.7 GHz frequency band.

Hereinafter, the present invention will primarily be described with respect to a specific impedance transformer structure that introduces two resonant modes as an example, but in light of the disclosure herein, those skilled in the art can easily and without creative labor develop other impedance transformer structures that include more than two resonant modes, which are also included within the scope of the present invention.

Figure 3:
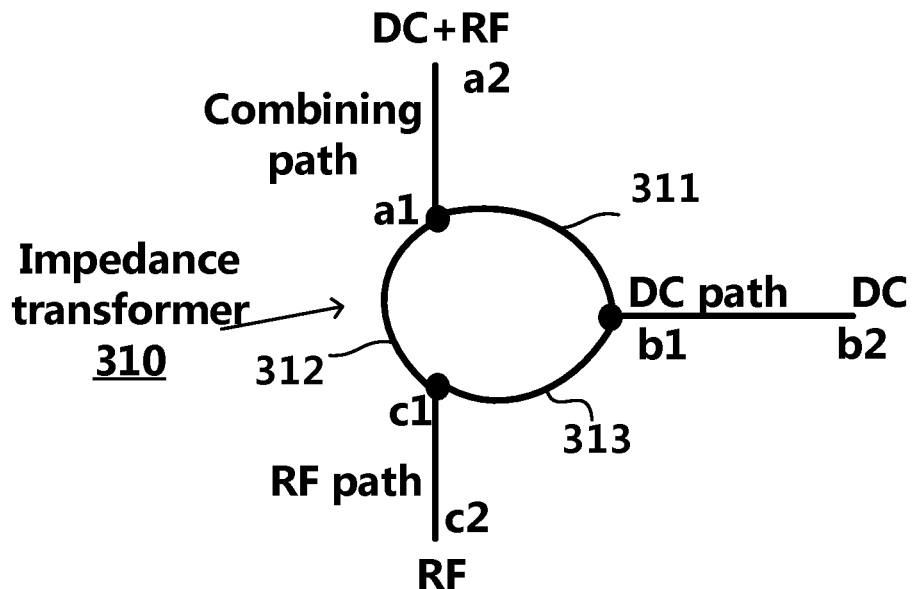
FIG. 3 is a more detailed schematic diagram of a bias tee circuit in accordance with some exemplary embodiments of the present invention.

FIG. 3 is a more detailed schematic diagram of a bias tee circuit in accordance with some exemplary embodiments of the present invention.

As shown in FIG. 3, the impedance transformer 310 includes first to third conductors 311-313, where the first conductor 311 is connected between the first end a1 of the combining path and the first end b1 of the DC path, the second conductor 312 is connected between the first end a1 of the combining path and the first end c1 of the RF path, and the third conductor 313 is connected between the first end c1 of the RF path and the first end b1 of the DC path.

Compared to the prior art structure of FIG. 1, the structure of FIG. 3 adds a bypass conductor, so that the DC path has one more connection point with the path through which the RF signal passes, and has two parallel branches to each of the two connection points. As a result of this design, the impedance transformer 310 has a closed loop structure. The impedance compensation of the two parallel branches can make up for the deficiency of the impedance transformation singularity using the single branch. For example, at one frequency in the desired operating band, when the DC path exhibits inductive impedance at the connection point via one branch, the DC path may exhibit capacitive impedance at the connection point via the other branch by adjusting various parameters (e.g., length) of the other branch. According to the principle of mutual compensation of the capacitive impedance and the inductive impedance in the microwave circuit, the impedance transformer 310 can make the DC path appear as an open- circuit (or as approximately an open-circuit) at the connection point a1 at one certain frequency, and also as an open-circuit (or as approximately an open-circuit) at the connection point c1 at another frequency. In other words, the impedance transformer 310 may be configured to introduce two resonant modes in the desired RF band such that the reflection coefficient has smaller magnitudes over a wider frequency band between the two resonant frequencies. In some embodiments, in order to achieve a wider operating bandwidth, the impedance transformer 310 may include additional connected conductors, thereby introducing more branches to compensate for impedance matching limit of the single branch, as will be discussed in detail later in connection with FIGS. 5-7. In some implementations, by adjusting the lengths of the conductors of the two branches, the properties of the impedances exhibited via the two branches may alternate between capacitive and inductive.

As shown in FIG. 3, the first conductor 311 constitutes a first branch that is connected between the combining path and the DC path, and the second conductor 312 and the third conductor 313 together constitute a second branch that is connected between the combining path and the DC path. These two branches may be designed such that the DC path exhibits capacitive impedance and inductive impedance at the first end a1 of the combining path via the two branches respectively. Either branch connecting the combing path and the DC path may exhibit the capacitive impedance and the other branch may exhibit the inductive impedance, as long as the capacitive impedance and the inductive impedance compensate each other such that the DC path is equivalent to an open-circuit at Point a1 at the desired frequency as much as possible (i.e., cause resonance).

In addition, the third conductor 313 constitutes a first branch that is connected between the DC path and the RF path, and the first conductor 311 and the second conductor 312 together constitute a second branch that is connected between the DC path and the RF path. These two branches may be set such that the DC path exhibits capacitive impedance and inductive impedance at the first end c1 of the RF path via the two branches respectively. Either branch connecting the RF path and the DC path may exhibit the capacitive impedance and the other branch may exhibit the inductive impedance, as long as the capacitive impedance and the inductive impedance compensate each other such that the DC path is equivalent to an open-circuit at Point c1 at the desired frequency as much as possible.

The parameters of the three conductors 311-313 may be designed according to practical applications by various ways such as theoretical formula, experience, experiment, simulation software, and the like.

Note that the curves in FIG. 3 are only schematic and are not intended to define or limit the shape of each conductor.

In some implementations, the above-mentioned three paths and the first to third conductors are microstrip transmission lines or stripline transmission lines.

Figure 4A:
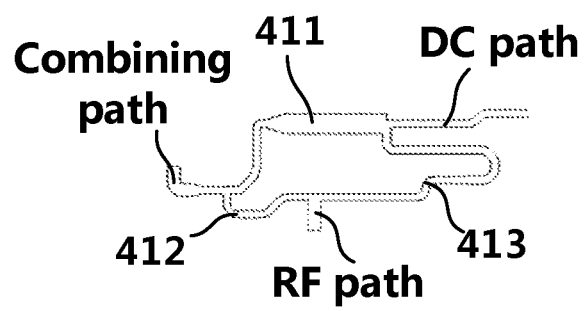
FIG. 4A is a plan view of one example implementation of the bias tee circuit of FIG. 3.

FIG. 4A is a plan view showing a specific example of the bias tee circuit of FIG. 3 implemented using microstrip transmission lines.

Although not shown in the drawing, those skilled in the art will appreciate that the microstrip transmission lines in FIG. 4A may further include an electrically insulating substrate and a grounded conductive member, where the grounded conductive member is disposed on one side of the electrically insulating substrate, and the metal pattern shown in FIG. 4A is disposed on the other side of the electrically insulating substrate. Note that the line shapes, lengths, widths, and the like of the combining path, the DC path, the RF path, and the first to third conductors 411-413 in FIG. 4A are merely exemplary and are not intended to limit the present invention.

Figure 4B:
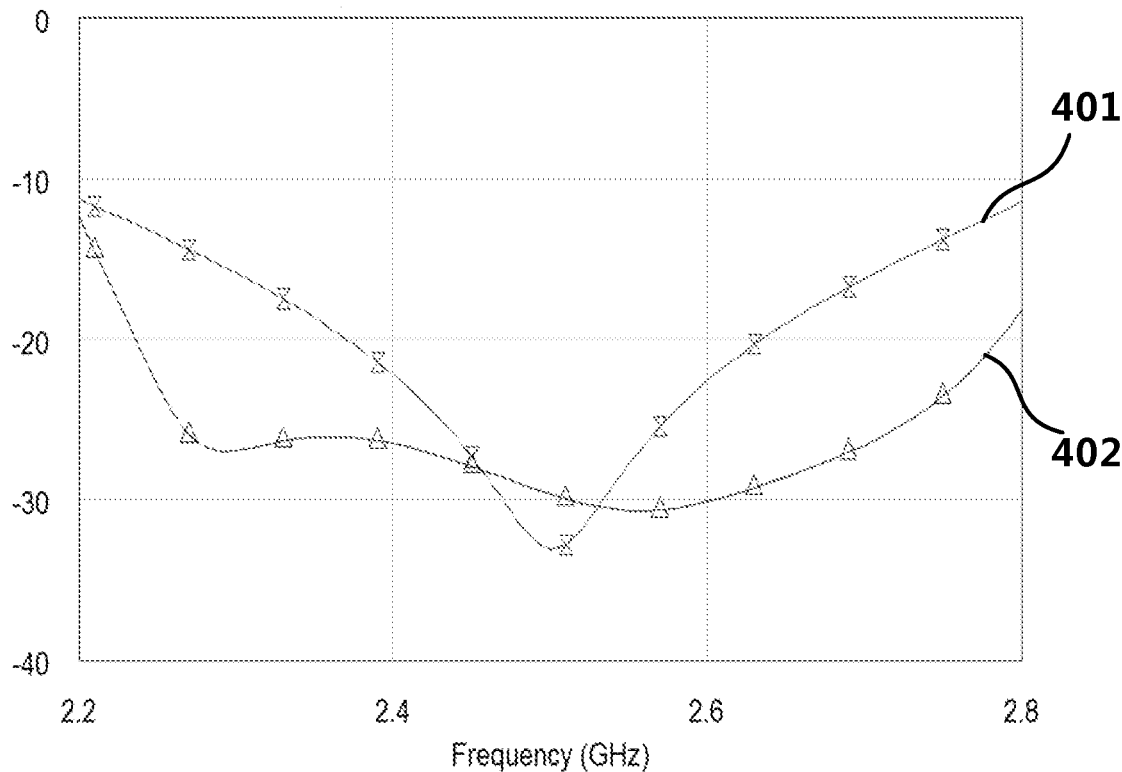
FIG. 4B is a graph of the return loss as a function of frequency for the bias tee circuits of FIGS. 1 and 4A.

FIG. 4B is a graph comparing the return loss performance (in dB) of the conventional bias tee circuit of FIG. 1 (curve 401) to the bias tee circuit according to embodiments of the present invention of FIG. 4A (curve 402). Curves 401 and 402 show the simulated return loss of the RF signal from the combining path to the RF path. They are merely exemplary and are mainly used to visually compare the shapes of the return loss curves of the two different structures, instead of intending to show specific values. Those skilled in the art appreciate that, herein the return loss RL=20 lg(Rho) dB, where Rho is the magnitude of the reflection coefficient, thus the return loss curve is an indication of the magnitude of the reflection coefficient.

As can be seen from the curve 401 in FIG. 4B corresponding to the prior art bias tee circuit of FIG. 1, the return loss has only one resonant mode, and has an appropriate value only in a very narrow band near the resonance frequency, thus the operating frequency band is narrow. In contrast, as can be seen from curve 402 corresponding to the bias tee circuit of an embodiment of the present invention, the return loss has a resonant mode near each of 2.3 GHz and 2.6 GHz, that is, has a local minimum, and the curve between the two resonance frequencies is relatively flat. Therefore, the bias tee circuit according to an embodiment of the present invention has smaller reflection coefficients at least within the frequency band between the two resonance frequencies, thereby widening the operating frequency band.

As previously mentioned, in order to achieve a larger operating frequency bandwidth, more branches can be introduced in the impedance transformer of FIG. 3.

In some embodiments, the impedance transformer according to the present invention may further include a fourth conductor having one end connected to the first end of the DC path, and the other end connected to the first end of the combining path or the first end of the RF path. In other embodiments, the one end of the fourth conductor may be connected to the first end of the DC path, and the other end is connected to a non-end point of any one of the first to third conductors. In still other embodiments, both ends of the fourth conductor may be respectively connected to non-end points of any two of the first to third conductors. Of course, those skilled in the art will understand that the present invention is not limited to the above structures, but may add more conductors into the impedance transformer as needed.

Figure 5:
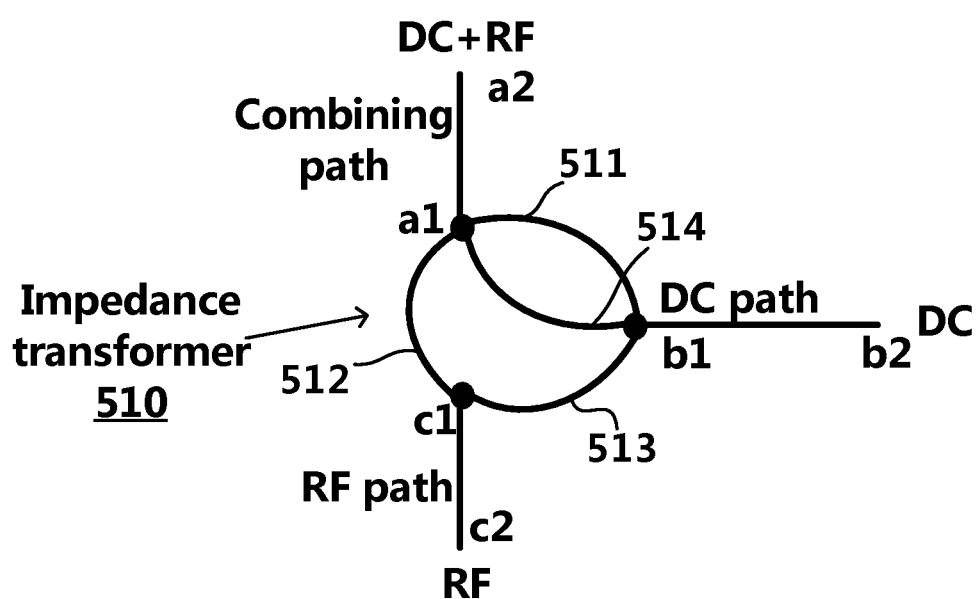
FIGS. 5-7 are schematic diagrams showing other configurations of bias tee circuits in accordance with embodiments of the present invention.
Figure 6:
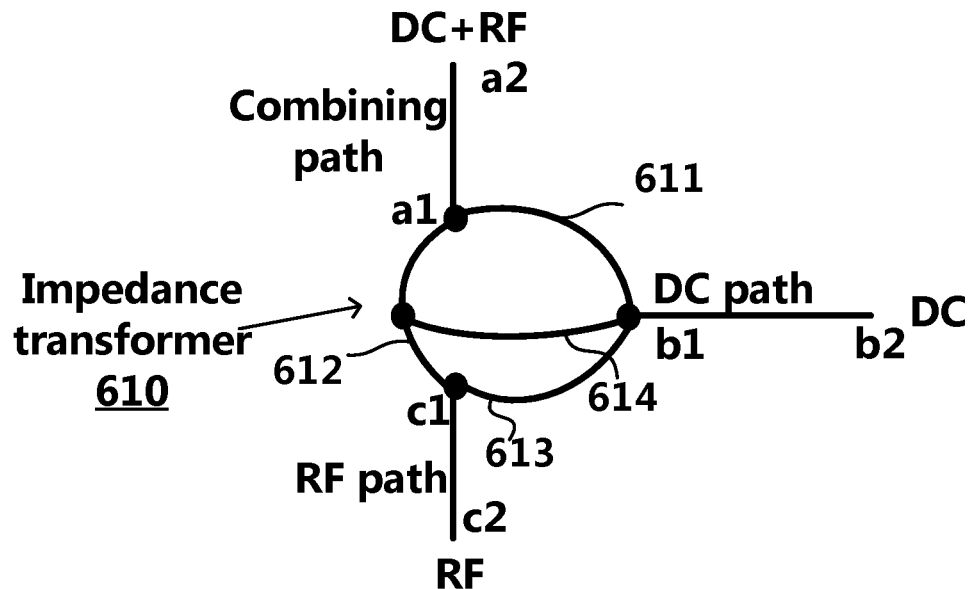
Figure 7:
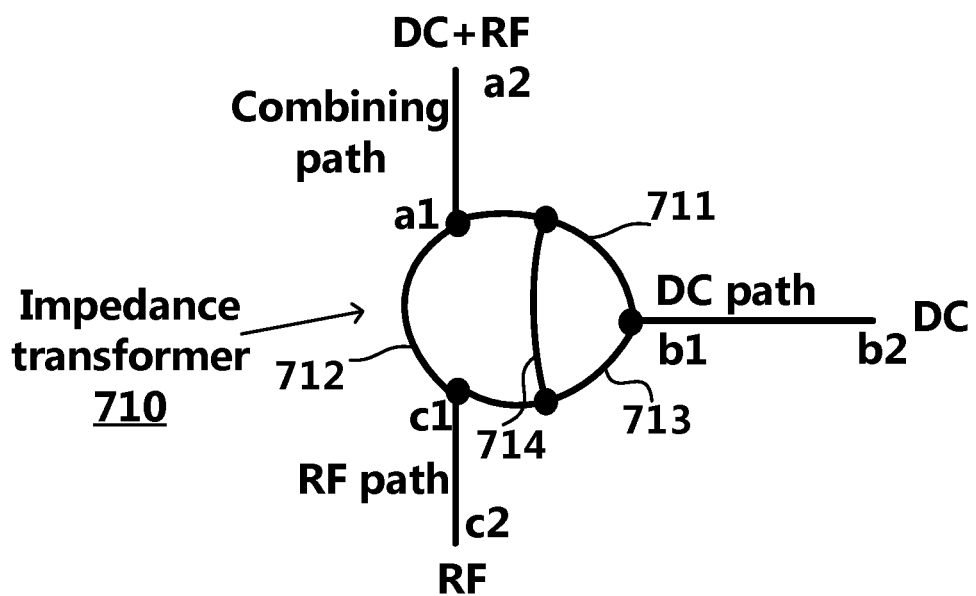

FIGS. 5-7 are schematic views respectively showing some examples of the above-described modifications of the bias tee circuit of FIG. 3.

As shown in FIG. 5, a conductor 514 is added between the first end a1 of the combining path and the first end b1 of the DC path.

As shown in FIG. 6, a conductor 614 is added between the first end b1 of the DC path and a non-end point of the second conductor 612. Thereby, the number of connection points of the DC path with the path through which the RF signal passes become three, and resonant modes may be introduced at three different frequencies respectively, thereby further widening the operating frequency band.

As shown in FIG. 7, a conductor 714 is added between a non-end point of the first conductor 711 and a non-end point of the third conductor 713.

By designing parameters (such as shape, length, connection point position and the like) of the respective conductors in FIGS. 5-7, the magnitude of the reflection coefficient of the RF signal and the operating frequency band can be further optimized.

It is noted that the impedance transformers according to embodiments of the present invention are not limited to the types and structures discussed above as long as the impedance transformer can introduce at least two resonant modes in the operating frequency band.

It should be noted that although the bias tee circuit as discussed in the background art is implemented on a calibration board for the base station antenna, the bias tee circuit of the present invention can be implemented elsewhere within the antenna, such as, for example, on a feedback board or phase shifter printed circuit board, or on its own printed circuit board.

Figure 8:
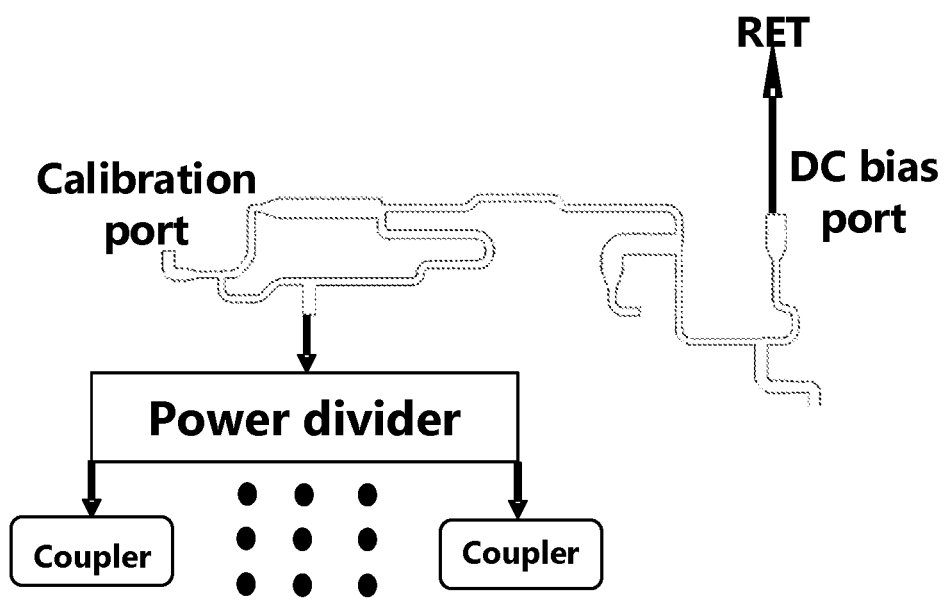
FIG. 8 is a schematic diagram of one specific structure of a calibration board for a base station antenna in accordance with exemplary embodiments of the present invention.

FIG. 8 illustrates one scenario in which a bias tee circuit in accordance with some exemplary embodiments of the present invention is implemented on a calibration board.

As shown in FIG. 8, the calibration board for the base station antenna is a PCB that includes the bias tee circuit as shown in FIG. 4A, a calibration port, a DC bias port, a power divider, and a plurality of couplers. The remote electronic tilt (RET) unit shown in FIG. 8 is not part of the calibration board, but instead refers to an actuator unit that is included in the antenna that is used to adjust electromechanical phase shifters that are included in the antenna for purpose of changing an electronic downtilt of an antenna beam generated by the antenna.

In some embodiments, one end of the combining path in the bias tee circuit may be connected to the calibration port, and may input a calibration signal as the combined signal. One end of the RF path is connected to the input of the power divider, and outputs the RF signal to the power divider which then distributes the RF signal to each of the couplers. One end of the DC path is connected to the DC bias port and outputs the DC power signal for powering the RET unit. Therefore, the DC signal and the RF signal can be simultaneously input by using only one cable without interfering with each other, and the bias tee circuit according to the present invention expands the operating frequency band of the transmitted RF signal.

Please note that, herein, when an element is described as located "on", "attached" to, "connected" to, "coupled" to or "in contact with" another element, etc., the element can be directly located on, attached to, connected to, coupled to or in contact with the other element, or there may be one or more intervening elements present. In contrast, when an element is described as "directly" located "on", "directly attached" to, "directly connected" to, "directly coupled" to or "in direct contact with" another element, there are no intervening elements present. In the description, references that a first element is arranged "adjacent" a second element can mean that the first element has a part that overlaps the second element or a part that is located above or below the second element.

Herein, the foregoing description may refer to elements or nodes or features being "coupled" together. As used herein, unless expressly stated otherwise, "coupled" means that one element/node/feature may be mechanically, electrically, logically or otherwise joined to another element/node/feature in either a direct or indirect manner to permit interaction even though the two features may not be directly connected. That is, "coupled" is intended to encompass both direct and indirect joining of elements or other features, including connection with one or more intervening elements.

Herein, terms such as "upper", "lower", "left", "right", "front", "rear", "high", "low" may be used to describe the spatial relationship between different elements as they are shown in the drawings. It should be understood that in addition to orientations shown in the drawings, the above terms may also encompass different orientations of the device during use or operation. For example, when the device in the drawings is inverted, a first feature that was described as being "below" a second feature can be then described as being "above" the second feature. The device may be oriented otherwise (rotated 90 degrees or at other orientation), and the relative spatial relationship between the features will be correspondingly interpreted.

Herein, the term "A or B" used through the specification refers to "A and B" and "A or B" rather than meaning that A and B are exclusive, unless otherwise specified.

The term "exemplary", as used herein, means "serving as an example, instance, or illustration", rather than as a "model" that would be exactly duplicated. Any implementation described herein as exemplary is not necessarily to be construed as preferred or advantageous over other implementations. Furthermore, there is no intention to be bound by any expressed or implied theory presented in the above FIELD, BACKGROUND, SUMMARY, and DETAILED DESCRIPTION.

Herein, the term "substantially", is intended to encompass any slight variations due to design or manufacturing imperfections, device or component tolerances, environmental effects and/or other factors. The term "substantially" also allows for variation from a perfect or ideal case due to parasitic effects, noise, and other practical considerations that may be present in an actual implementation.

Herein, certain terminology, such as the terms "first", "second" and the like, may also be used for the purpose of reference only, and thus are not intended to be limiting. For example, the terms "first", "second" and other such numerical terms referring to structures or elements do not imply a sequence or order unless clearly indicated by the context.

Further, it should be noted that, the terms "comprise", "include", "have" and any other variants, as used herein, specify the presence of stated features, steps, operations, elements, and/or components, but do not preclude the presence or addition of one or more other features, steps, operations, elements, components, and/or groups thereof.

Although some specific embodiments of the present invention have been described in detail with examples, it should be understood by a person skilled in the art that the above examples are only intended to be illustrative but not to limit the scope of the present invention. The embodiments disclosed herein can be combined arbitrarily with each other, without departing from the scope and spirit of the present invention. It should be understood by a person skilled in the art that the above embodiments can be modified without departing from the scope and spirit of the present invention. The scope of the present invention is defined by the attached claims.

That which is claimed is:

1. A bias tee circuit, comprising:
   a combining path having a first end and a second end that is configured to transmit a combined signal which comprises a combination of a radio frequency (RF) signal and a direct current (DC) signal,
   an RF path having a first end and a second end that is configured to transmit the RF signal included in the combined signal,
   a DC path having a first end and a second end that is configured to transmit the DC signal included in the combined signal, and
   an impedance transformer connected between the first end of the combining path, the first end of the RF path, and the first end of the DC path that is configured to make a reflection coefficient of the RF signal transmitted between the second end of the combining path and the second end of the RF path have at least two resonant modes within an operating RF band.

2. The bias tee circuit according to claim 1, wherein said impedance transformer comprises first to third conductors, where the first conductor is connected between the first end of the combining path and the first end of the DC path, the second conductor is connected between the first end of the combining path and the first end of the RF path, and the third conductor is connected between the first end of the RF path and the first end of the DC path.

3. The bias tee circuit according to claim 2, wherein the first conductor constitutes a first branch connected between the combining path and the DC path,
   the second conductor and the third conductor together constitute a second branch connected between the combining path and the DC path,
   the first branch and the second branch are arranged such that the DC path exhibits one of capacitive impedance and inductive impedance at the first end of the combining path via the first branch and exhibits the other of capacitive impedance and inductive impedance at the first end of the combining path via the second branch.

4. The bias tee circuit according to claim 2, wherein the third conductor constitutes a first branch connected between the DC path and the RF path,
   wherein the first conductor and the second conductor together constitute a second branch connected between the DC path and the RF path, and
   wherein the first branch and the second branch are arranged such that the DC path exhibits one of capacitive impedance and inductive impedance at the first end of the RF path via the first branch and exhibits the other of capacitive impedance and inductive impedance at the first end of the RF path via the second branch.

5. The bias tee circuit according to claim 2, wherein the impedance transformer further comprises a fourth conductor having one end connected to the first end of the DC path, and the other end connected to the first end of the combining path or the first end of the RF path.

6. The bias tee circuit according to claim 2, wherein the impedance transformer further comprises a fourth conductor having one end connected to the first end of the DC path, and the other end connected to a non-end point of any one of the first to third conductors.

7. The bias tee circuit according to claim 2, wherein the impedance transformer further comprises a fourth conductor having two ends respectively connected to non- end points of any two of the first to third conductors.

8. The bias tee circuit according to claim 2, wherein the first to third conductors are microstrip transmission lines or stripline transmission lines.

9. The bias tee circuit according to claim 1, wherein the operating RF band is 2.3-2.7 GHz.

10. The bias tee circuit according to claim 1, wherein the combining path is configured to input a combined signal from the second end of the combining path,
    the RF path is configured to output the RF signal included in the combined signal from the second end of the RF path,
    the DC path is configured to output the DC signal included in the combined signal from the second end of the DC path, and
    the impedance transformer is configured to make the reflection coefficient of the RF signal output from the RF path have at least two resonant modes within the operating RF band.

11. The bias tee circuit according to claim 1, wherein the RF path is configured to input the RF signal from the second end of the RF path,
    the DC path is configured to input the DC signal from the second end of the DC path,
    the combining path is configured to output the combined signal obtained by combining the RF signal and the DC signal from the second end of the combining path, and
    the impedance transformer is configured to make the reflection coefficient of the RF signal in the combined signal output from the combining path have at least two resonant modes within the operating RF band.

12. A calibration board for a base station antenna, comprising:
    the bias tee circuit according to claim 1,
    a calibration port,
    a DC bias port, and
    a power divider, wherein the second end of the combining path in the bias tee circuit is connected to the calibration port and configured to input a calibration signal as the combined signal, the second end of the RF path is connected to an input of the power divider and configured to output the RF signal to the power divider, the second end of the DC path is connected to the DC bias port and configured to output the DC signal for driving a RET.

13. A bias tee circuit, comprising:
a direct current (DC) port;
a radio frequency (RF) port;
a combined port;
an impedance transformer that is configured to pass DC signals received at the combined port to the DC port while substantially blocking RF signals received at the combined port from passing to the DC port and that is configured to pass RF signals received at the combined port to the RF port while substantially blocking DC signals received at the combined port from passing to the RF port, wherein the impedance transformer includes a closed loop that connects the combined port to both the DC port and to the RF port;
a combining path that connects the combined port to the closed loop;
an RF path that connects the RF port to the closed loop; and
a DC path that connects the DC port to the closed loop, wherein the closed loop includes a first conductor that is connected between a first intersection of the combining path and the closed loop and a second intersection of the DC path and the closed loop, a second conductor that is connected between the first intersection of the combining path and the closed loop and a third intersection of the RF path and the closed loop, and a third conductor that is connected between the second intersection of the DC path and the closed loop and the third intersection of the RF path and the closed loop.

14. The bias tee circuit according to claim 13, wherein the first conductor comprises a first branch of the closed loop and a combination of the second conductor and the third conductor comprise a second branch of the closed loop, and
wherein the first branch and the second branch are arranged such that the DC path exhibits one of capacitive impedance and inductive impedance at the first intersection of the combining path and the closed loop via the first branch and exhibits the other of capacitive impedance and inductive impedance at the first end of the combining path via the second branch.

* * * * *